United States Patent Office.

SALOMON HEIMANN, OF NEW YORK, ASSIGNOR OF TWO-THIRDS TO FRANK L. POMMER, OF STAPLETON, AND ALBERT E. HACHFIELD, OF BROOKLYN, NEW YORK.

PROCESS OF TREATING PEAT.

SPECIFICATION forming part of Letters Patent No. 378,395, dated February 21, 1888.

Application filed May 20, 1887. Serial No. 238,831. (No specimens.)

*To all whom it may concern:*

Be it known that I, SALOMON HEIMANN, of the city, county, and State of New York, have invented certain new and useful Improvements in Processes of Treating Peat, of which the following is a specification.

This invention relates to an improved process of treating peat in order to produce a superior non-conducting covering for underground wires and a good insulating material for electrical purposes generally for battery-cells and the like; and the invention consists in a process of treating peat by pressing, drying, and grinding the same, mixing it with caoutchouc and pulverized sulphur, pressing it into suitable molds, and vulcanizing the same.

The invention consists, secondly, of a composition for underground electric wires, battery-cells, and the like, which is composed of a mixture of ground peat with hard rubber.

In carrying out my invention the peat is cut from the peat moor or bog and pressed by means of a hydraulic or other press, so as to remove from eighty to eighty-five per cent. of water contained therein. The pressed pieces are then dried either in the atmosphere or by suitable drying apparatus. The dry peat is then ground by suitable machinery and screened until a fine meal is obtained. This peat-meal is mixed with ten to twenty per cent. of caoutchouc, to which a quantity of pulverized sulphur necessary for the vulcanizing process is added. The mixture is pressed into molds and vulcanized, so that the parts are united into a homogeneous mass which partakes of the characteristic of hard rubber, but which is much cheaper than hard rubber, owing to the large percentage of peat contained in the same. It is a good non-conductor of heat and can be applied to all apparatus for which hard rubber is now used for insulating purposes.

The mass can also be heated and rolled by means of rollers into plates of the desired thickness, which plates are afterward cut and bent and made up into cells or other vessels, the seams of which are united by a cement composition of the same material and then vulcanized. If it be desired to produce a very hard and tough insulating material, it is desirable to add from five to ten per cent. of plaster-of-paris to the mass. For making underground conductors the soft plates are rolled around the wires, pressed on the same to the required thickness, and vulcanized by passing the covered cable formed in this manner slowly through an oven and exposing the covering in this manner to the required degree of heat.

Having thus described my invention, I claim as new and desire to secure by Letters Patent—

1. The process herein described of treating peat, which consists in pressing, drying, and grinding the same, next mixing it with caoutchouc and pulverized sulphur, forming it in suitable shapes, and vulcanizing the same, substantially as set forth.

2. A non-conducting composition consisting of a vulcanized mixture of dry pulverized peat, caoutchouc, and sulphur, substantially as set forth.

3. A non-conducting composition consisting of a vulcanized mixture of dry pulverized peat, caoutchouc, sulphur, and plaster-of-paris, substantially as set forth.

In testimony that I claim the foregoing as my invention I have signed my name in presence of two subscribing witnesses.

SALOMON HEIMANN.

Witnesses:
CARL KARP,
SIDNEY MANN.